3,578,397
PREPARATION OF ANHYDROUS CUPROUS
CHLORIDE OR BROMIDE
Harold E. Doorenbos, Midland, Mich., assignor to The
Dow Chemical Company, Midland, Mich.
No Drawing. Filed Nov. 26, 1969, Ser. No. 880,423
Int. Cl. C01g 3/04
U.S. Cl. 23—97                                                    2 Claims

ABSTRACT OF THE DISCLOSURE

Essentially anhydrous cuprous chloride or bromide is prepared by reacting cupric chloride or bromide with an alkyl hydrogen phosphonate.

The invention herein described was made in the course of or under a contract with the United States Air Force.

BACKGROUND OF THE INVENTION

Many of the present techniques for producing cuprous halides, e.g., cuprous chloride, involve reacting cupric halide, copper and a halide salt or acid, e.g. NaCl or HCl, in aqueous solution.

An object of the present invention is to provide a rapid, efficient method of preparing anhydrous cuprous halide.

THE INVENTION

The present method comprises reacting cupric halide with an alkyl hydrogen phosphonate to prepare essentially anhydrous cuprous halide.

The term "halide," as used herein, refers to chloride, bromide and mixtures thereof.

The term "alkyl hydrogen phosphonate," as used herein, refers to mono-alkyl and dialkyl hydrogen phosphonates and mixtures thereof. Examples of suitable phosphonates include methyl, dimethyl, ethyl, diethyl, n-butyl, di-n-butyl, octyl, dioctyl hydrogen phosphonates. The preferred phosphonates are those wherein the alkyl group has from 1 to 4 carbon atoms.

The presence of substantial amounts of oxygen and water is detrimental to the reaction. Accordingly, cupric halide in the anhydrous form is preferred. Further, the reaction should be carried out in an inert, i.e. non-reactive with the raw materials used, atmosphere such as $N_2$.

In the practice of the present invention, cupric halide and the alkyl hydrogen phosphonate are admixed in an appropriate container. Reaction temperatures are preferably within the range from about 0° C. to 100° C. As the temperature of the reaction increases, the time of reaction decreases. An equal molar reaction takes place which results in the formation of essentially anhydrous cuprous halide. Use of an excess of alkyl hydrogen phosphonate increases the rate of reaction.

While solid cupric chloride can be employed, the rate of reaction is increased when the cupric halide is in slurry form. The slurry can be obtained by admixing the cupric halide with a suitable diluent. Examples of diluents include chlorinated hydrocarbon solvents, such as $CCl_4$ and aliphatic ethers, such as dioxane, tetrahydrofuran, and diethyl ether.

The anhydrous cuprous halide product can be separated from any residue solution, e.g. diluent, excess alkyl hydrogen phosphonate or reaction by-products, by conventional means, e.g. filtration, centrifugation. Diluents such as those mentioned above can be added to the precipitate-containing solution to dilute same for easy filtration.

The following example further illustrates the present invention.

EXAMPLE 26.89 grams (0.2 mole) of anhydrous $CuCl_2$ were placed in a flask fitted with an $N_2$ inlet and condenser. A slurry of $CuCl_2$ was formed by admixing 100 ml. reagent grade dioxane. 13.9 grams of diethyl hydrogen phosphonate were admixed under $N_2$ atmosphere. The solution was held at room temperature for about 60 hours during which a white, cuprous chloride precipitate was formed.

250 ml. of $CCl_4$ was added to dilute the solution and the solution was filtered through a fritted glass funnel under $N_2$. $N_2$ gas was blown over the precipitate to remove any residual $CCl_4$. The anhydrous cuprous chloride weighed 19.6 grams, representing a yield of 98.5%.

In a similar manner $CuCl_2$ and $CuBr_2$ can be reacted with other alkyl hydrogen phosphonates to produce an essentially anhydrous cuprous halide at high yield.

What is claimed is:
1. A process for preparing an essentially anhydrous cuprous chloride or cuprous bromide or mixture thereof, which comprises:
   (a) reacting a substantially equal molar ratio of an anhydrous alkyl hydrogen phosphonate and an anhydrous member of the group consisting of cupric chloride, cupric bromide and mixture thereof, at a temperature range of about 0°–100° C., in the presence of an inert atmosphere which is essentially free of oxygen and $H_2O$, for a sufficient period of time to produce a high yield of said cuprous chloride or cuprous bromide or mixture thereof;
   (b) separating and recovering the essentially anhydrous cuprous halide or mixture of cuprous halides.
2. The method of claim 1 wherein the cupric halide is first slurried with an inert organic diluent.

References Cited

UNITED STATES PATENTS

| | | | |
|---|---|---|---|
| 1,964,569 | 6/1934 | Gernes | 23—97 |
| 2,049,402 | 7/1936 | Wernlund | 23—97 |
| 2,126,455 | 8/1938 | Dettwyler | 23—97 |
| 3,030,178 | 4/1962 | Niemann et al. | 23—97 |

EDWARD STERN, Primary Examiner

U.S. Cl. X.R.

23—88